United States Patent
Fujiwara et al.

(10) Patent No.: US 12,090,574 B2
(45) Date of Patent: Sep. 17, 2024

(54) LASER SLICING APPARATUS AND LASER SLICING METHOD

(71) Applicant: PANASONIC CORPORATION, Osaka (JP)

(72) Inventors: Kazuki Fujiwara, Osaka (JP); Yoshiro Kitamura, Osaka (JP); Katsuji Sumimoto, Nara (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 908 days.

(21) Appl. No.: 16/247,075

(22) Filed: Jan. 14, 2019

(65) Prior Publication Data
US 2019/0224784 A1 Jul. 25, 2019

(30) Foreign Application Priority Data

Jan. 19, 2018 (JP) .................................. 2018-007511
Nov. 12, 2018 (JP) .................................. 2018-212024

(51) Int. Cl.
*B23K 26/06* (2014.01)
*B23K 26/00* (2014.01)
(Continued)

(52) U.S. Cl.
CPC .......... *B23K 26/38* (2013.01); *B23K 26/0006* (2013.01); *B23K 26/0619* (2015.10);
(Continued)

(58) Field of Classification Search
CPC .. B23K 26/53; B23K 26/064; B23K 26/0643; B23K 26/06408; B23K 26/067;
(Continued)

(56) References Cited

U.S. PATENT DOCUMENTS

| 4,190,759 A | * | 2/1980 | Hongo | .................. B23K 26/57 |
| | | | | 219/121.79 |
| 4,689,467 A | * | 8/1987 | Inoue | ................. B23K 26/0665 |
| | | | | 219/121.84 |

(Continued)

FOREIGN PATENT DOCUMENTS

WO  2017-126506 A1  7/2017

OTHER PUBLICATIONS

JP2008023579A (Year: 2006).*
English Translation of JP2008023579A (Year: 2006).*

*Primary Examiner* — Helena Kosanovic
*Assistant Examiner* — Tiffany T Tran
(74) *Attorney, Agent, or Firm* — PEARNE & GORDON LLP (57) ABSTRACT

A laser slicing apparatus for dividing a workpiece with a laser beam, including: a light shielding area detection section that detects light shielding areas existing on a side of a first surface of the workpiece; and a control section that radiates a first laser beam from the side of the first surface so as to scan across a whole area of the first surface of the workpiece and form a first modified layer in a to-be-sliced plane inside the workpiece, and that radiates a second laser beam to the light shielding areas of the workpiece from a second surface on an opposite side of the first surface and form a second modified layer in such a manner that the second modified layer is continuous with the first modified layer in the to-be-sliced plane.

13 Claims, 8 Drawing Sheets

(51) Int. Cl.
*B23K 26/0622* (2014.01)
*B23K 26/067* (2006.01)
*B23K 26/08* (2014.01)
*B23K 26/38* (2014.01)
*B23K 26/53* (2014.01)
*B23K 101/40* (2006.01)
*B23K 103/00* (2006.01)

(52) U.S. Cl.
CPC ...... *B23K 26/0624* (2015.10); *B23K 26/0676* (2013.01); *B23K 26/0861* (2013.01); *B23K 26/53* (2015.10); *B23K 2101/40* (2018.08); *B23K 2103/56* (2018.08)

(58) Field of Classification Search
CPC ............ B23K 2101/40; B23K 2103/56; B23K 26/0006; B23K 26/0619; B23K 26/0624; B23K 26/0676; B23K 26/0861; B23K 26/38; B23K 26/032; B23K 2103/10; B23K 26/703; B23K 26/082; B23K 26/32; B23K 26/24; B23K 26/28; B23K 26/22; B23K 26/0622; B23K 2101/18; B23K 2101/006; B23K 26/323; B23K 26/044; B23K 2203/04; B23K 26/26; B23K 26/244; B23K 26/14; B23K 31/125; B23K 26/20; B23K 26/0066; B23K 26/0626; B23K 26/073; B23K 26/50; G03F 1/72; H01L 21/76894; G01N 21/9505; C03B 33/093

USPC ............ 219/121.63, 121.64, 121.72, 36, 119
See application file for complete search history.

(56) References Cited

U.S. PATENT DOCUMENTS

| | | | | |
|---|---|---|---|---|
| 5,578,229 | A * | 11/1996 | Barnekov | B27M 1/06 |
| | | | | 219/121.72 |
| 2002/0056891 | A1* | 5/2002 | Wu | C03B 33/093 |
| | | | | 257/620 |
| 2002/0060210 | A1* | 5/2002 | Terada | B23K 26/0676 |
| | | | | 219/121.76 |
| 2003/0111447 | A1* | 6/2003 | Corkum | B23K 26/032 |
| | | | | 219/121.76 |
| 2007/0039932 | A1* | 2/2007 | Haase | B23K 26/40 |
| | | | | 219/121.67 |
| 2011/0171757 | A1* | 7/2011 | Yamamuro | B23K 26/364 |
| | | | | 257/E31.11 |
| 2014/0103495 | A1* | 4/2014 | Mackh | H01L 22/34 |
| | | | | 257/620 |
| 2015/0325787 | A1* | 11/2015 | Ahn | H01L 45/141 |
| | | | | 438/382 |
| 2016/0059354 | A1* | 3/2016 | Sercel | B23K 26/361 |
| | | | | 264/400 |
| 2016/0228985 | A1* | 8/2016 | Hirata | B23K 26/08 |
| 2017/0243341 | A1* | 8/2017 | Takeda | B23K 26/032 |

\* cited by examiner

Related Art

Related Art

LASER SLICING APPARATUS AND LASER SLICING METHOD

TECHNICAL FIELD

The present invention relates to a laser slicing apparatus and a laser slicing method.

BACKGROUND ART

Substrates composed of a brittle material represented by a silicon wafer (hereinafter also referred to as "wafer") have been known heretofore.

In general, when this type of wafer is produced, the wafer (substrate) is manufactured by executing a step of producing a cylindrical ingot by growing and solidifying silicon crystal from silicon melt in a quartz crucible, a step of cutting the ingot into blocks with an appropriate length, and a step of grinding a peripheral portion of the block to a target diameter, and then slicing the block of ingot with a wire saw However, there is a need for a cutting margin larger than the thickness of the wire saw in this case, and thus a problem is that it is very difficult to manufacture a thin wafer with a thickness of 0.1 mm or less and an improved yield cannot be expected.

A method capable of solving the problems is a laser slicing method. The laser slicing method is an approach that adjusts a focus point of a laser beam to the inside of a brittle material (for example, a block of ingot) with a condenser lens, scans the inside of the brittle material by the laser beam, thereby forms a planar modified area by multiphoton absorption inside the brittle material, and uses the modified area as a detachment plane to detach part of the brittle material as a wafer. This type of laser slicing method is applied to various types of material including not only silicon (Si) but also silicon carbide (SiC), gallium nitride (GaN), and the like.

In the case of applying the laser slicing method to, for example, gallium nitride (GaN) or the like, however, defects called pits have occurred during crystal growth in the ingot, and there is a case where the defects is a problem. A representative defect is hexagonal pyramid-shaped holes which occur due to a crystal structure and many of which are black and on a polar surface called an N surface of crystal growth surfaces.

Figure 8A:
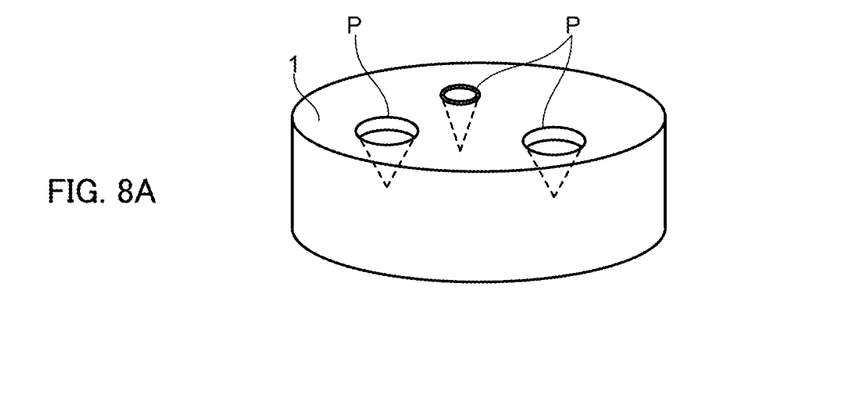
FIG. 8A is a diagram illustrating a problem of defective parts (flaws or pits) in a brittle material in a general laser slicing method.
Figure 8B:
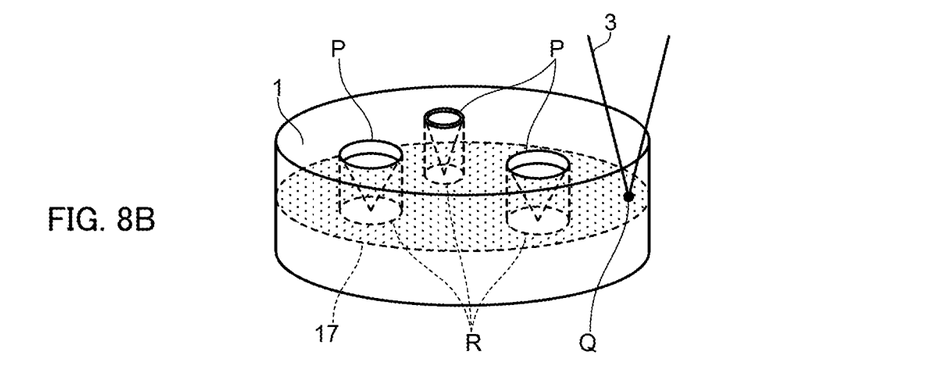
FIG. 8B is a diagram illustrating the problem of defective parts (flaws or pits) in the brittle material in the general laser slicing method.
Figure 8C:
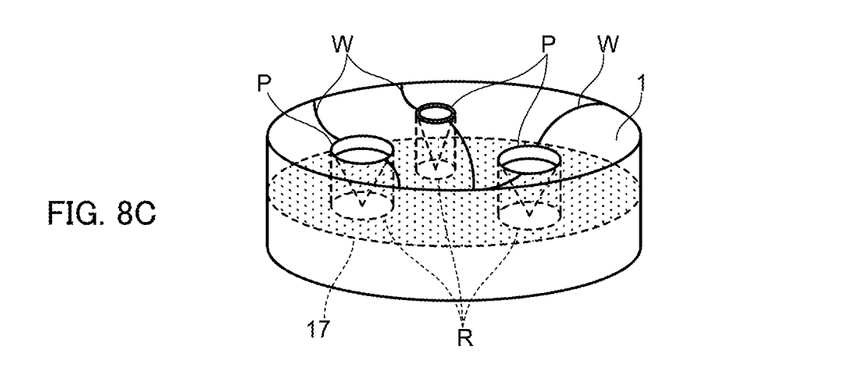
FIG. 8C is a diagram illustrating the problem of defective parts (flaws or pits) in the brittle material in the general laser slicing method.

FIGS. 8A, 8B, and 8C are diagrams illustrating the problem of the defective parts (flaws or pits) within the brittle material in a general laser slicing method.

FIG. 8A represents a state of the brittle material before laser radiation and FIG. 8B represents a state of the brittle material after forming a modified area by laser radiation. FIG. 8C represents a state of the brittle material when the brittle material is being divided after forming the modified area by laser beam radiation.

In FIGS. 8A, 8B, and 8C, brittle material 1 is a thick-film substrate composed of a crystal material, for example, GaN. Laser beam 3 is a beam radiated by a laser oscillator, and can be converged and radiated to the inside of the material by using a condenser lens. The modified layer is a modified area formed when laser beam 3 is converged and radiated to the inside of the brittle material by the condenser lens. Focus point Q is a point where laser beam 3 converges. Defective part P is a defect of the brittle material, and, for example, a defect called a pit in the case of GaN.

Unmodified area R is an area where a modified layer was not formed when laser beam 3 was converged and radiated by the condenser lens because the area was below defective part P and not processed due to laser beam 3 being blocked by defective part P. In order to divide brittle material 1, it is necessary that the whole area is modified, and if there is unmodified area R, because upper and lower parts of brittle material 1 having the modified layer interposed between them are connected via unmodified area R, a chip or crack occurs in brittle material 1 starting from unmodified area R when the brittle material is divided starting from the modified layer.

FIGS. 8A, 8B, and 8C illustrate a situation in which chip W occurs when brittle material 1 is detached starting from the modified layer in the case where there are unmodified areas R.

PTL 1 describes an approach to use a laser beam having an annular strength profile so as not to cause an unmodified area inside brittle material 1 in the above-described laser slicing method using the laser beam.

In PTL 1, the brittle material is, for example, a plate-like body composed of a crystal material before slicing. The modified layer is formed by relatively moving a position of a pulse laser beam with respect to the brittle material by using, for example, an XY stage and linearly extending the modified area. There is a case where at least one of a crack, melting process, change in a refractive index, or the like is present in the modified layer. A light shielding area is a striped high-density defect area provided to extend in a direction intersecting with a to-be-cut line.

CITATION LIST

Patent Literature

PTL 1
 WO 2017/126506

SUMMARY OF INVENTION

Technical Problem

In the related art of PTL 1, in order to process a part below the light shielding area, the pulse laser beam needs to have a beam diameter larger than the light shielding area, and correspondingly energy density at a focus point becomes larger.

In the laser slicing method according to the related art of PTL 1, the energy density by the pulse laser beam may be too large if a size of a defective part (flaw or pit) is large, and has a risk of increasing chips or cracks in the inside a substrate after division.

An object of the present invention, which has been made in consideration of the above-described problem, is to provide a laser slicing apparatus and a laser slicing method that allow a workpiece to be divided without causing chips or cracks to occur.

Solution to Problem

The present disclosure for solving the problem above mainly provides a laser slicing apparatus for dividing a workpiece with a laser beam, the laser slicing apparatus including: a light shielding area detection section that detects light shielding areas existing on a side of a first surface of the workpiece; and a control section that radiates a first laser beam from the side of the first surface so as to scan across a whole area of the first surface of the workpiece and forms a first modified layer in a to-be-sliced plane inside the workpiece, and that radiates a second laser beam to the light shielding areas of the workpiece from a second surface on an opposite side of the first surface and forms a second modified layer in such a manner that the second modified layer is continuous with the first modified layer in the to-be-sliced plane.

Meanwhile, in another aspect, the present disclosure for solving the problem above mainly provides a laser slicing method for dividing a workpiece with a laser beam, the method including: detecting light shielding areas existing on a side of a first surface of the workpiece; radiating a first laser beam from the side of the first surface so as to scan across a whole area of the first surface of the workpiece and forming a first modified layer in a to-be-sliced plane inside the workpiece; and radiating a second laser beam to the light shielding areas of the workpiece from a second surface on an opposite side of the first surface and forming a second modified layer in such a manner that the second modified layer is continuous with the first modified layer in the to-be-sliced plane.

Advantageous Effects of Invention

The laser slicing apparatus according to the present invention allows a workpiece to be divided without causing chips or cracks to occur even if there are defective parts in a brittle material.

DESCRIPTION OF EMBODIMENTS

Hereinafter, a description of preferred embodiments of the present disclosure will be given in detail with reference to the accompanying drawings. In the specification and accompanying drawings, components having substantially the same functions will be given the same symbols and thereby duplicate description will be omitted.

Embodiment 1

[Configuration of Laser Slicing Apparatus]

Figure 1:
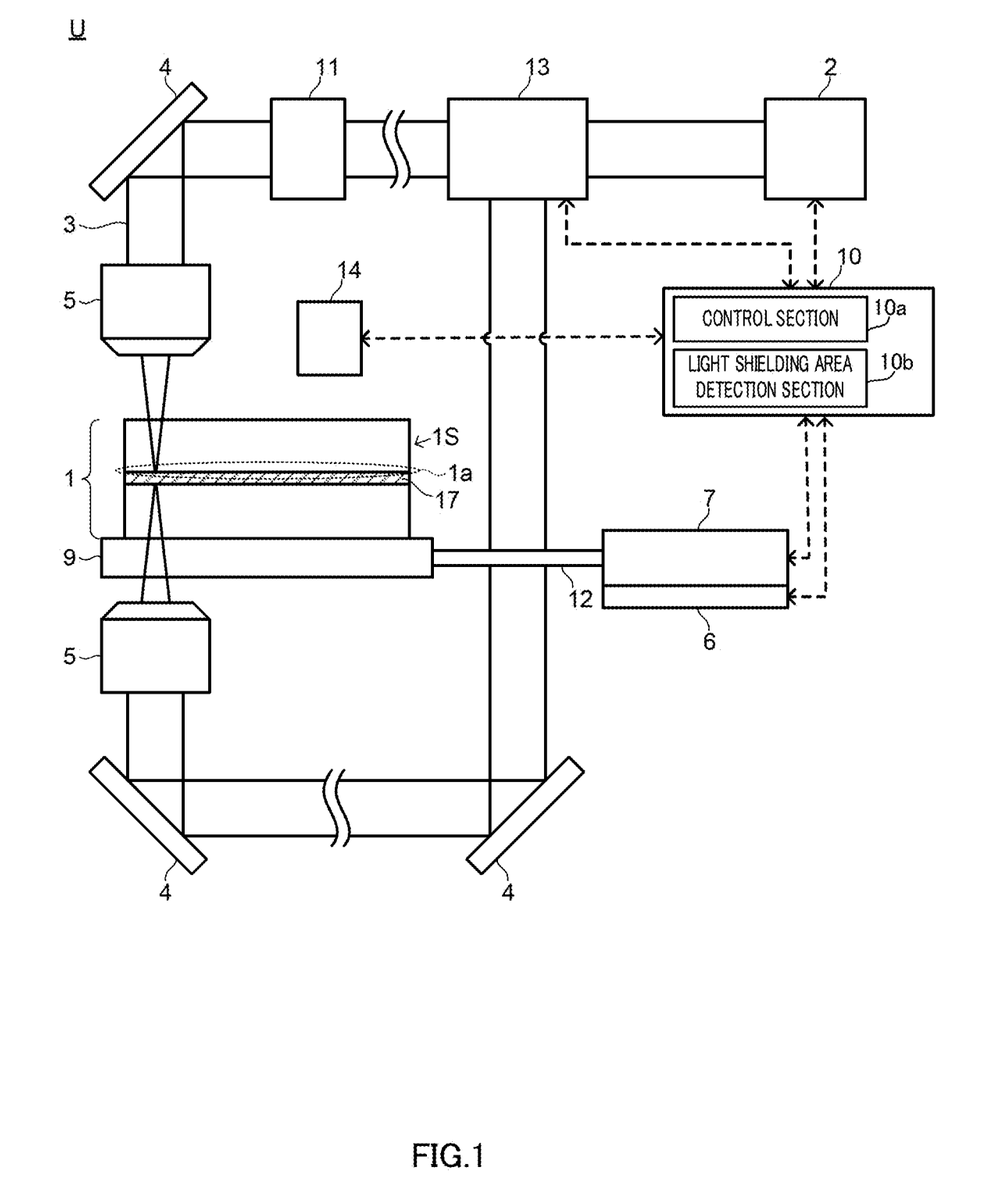
FIG. 1 is a schematic diagram showing a configuration of a laser slicing apparatus according to a first embodiment.

FIG. 1 is a schematic diagram of a configuration of laser slicing apparatus U according to a first embodiment.

Laser slicing apparatus U according to the embodiment includes laser oscillator 2, mirror 4, condenser lens 5, Z stage 6, XY stage 7, fixing jig 9, control computer 10, phase modulation element 11, fixing jig 12, laser beam path switching apparatus 13, and camera 14.

Laser slicing apparatus U according to the embodiment separates substrate 1S from brittle material 1 (corresponding to a "workpiece" in the present invention) fixed to fixing jig 9.

Brittle material 1 is typically a semiconductor material (for example, Si, SiC, GaN, or the like) made into a plate. As brittle material 1, for example, a GaN ingot with a diameter of two inches or the like is used. As brittle material 1, however, other brittle materials other than the semiconductor material can be used.

Brittle material 1 is prepared by planarizing front and back surfaces to a predetermined surface roughness (for example, its rms value is several μm) or less in advance for suppressing reflection on the front and back surfaces when laser beam 3 is radiated.

Thickness and diameter of brittle material 1 are not specifically limited, but preferably the thickness is 50 μm or more and 10 mm or less and the diameter is 10 inches or less.

Laser oscillator 2 is an apparatus to radiate laser beam 3. A wavelength of laser beam 3 radiated by laser oscillator 2 is selected such that the wavelength is suitable to form a modified layer inside brittle material 1 by multiphoton absorption. Furthermore, it is desirable that the wavelength of laser beam 3 radiated by laser oscillator 2 is selected also in consideration of transmittance for material to be processed. This enables efficient processing.

Laser beam 3 radiated by laser oscillator 2 is, for example, parallel light with a beam diameter of 6 mm, but any laser beam will do as long as it has a beam diameter that allows the laser beam to enter condenser lens 5.

Laser beam 3 radiated by laser oscillator 2 preferably has a wavelength that is within a range from 100 nm or more to 10,000 nm or less and that allows 30% or more of the laser beam to pass through brittle material 1. In addition, the wavelength of laser beam 3 is desirably shorter because a shorter wavelength allows a spot diameter to be smaller during converging the beam and allows heat impact on brittle material 1 to be reduced. Pulse width of laser beam 3 radiated by laser oscillator 2 is not limited as long as internal processing by multiphoton absorption is available and it is within a range of 50 ps or shorter. A high repetition frequency is better in terms of productivity, but it has heat impact, so a repetition frequency that is within a range from 1 Hz or more to 10 MHz or less and well-balanced is applied.

Laser beam 3 radiated by laser oscillator 2 is typically 532 nm or less in wavelength, 50 ps or less in pulse width, 10 MHz or less in frequency, 0.95 or less in numerical aperture (NA), and a converged spot diameter or less in pitch between pulses and pitch between lines. This allows a modified layer to be formed in brittle material 1 without chips.

Mirror 4 reflects laser beam 3 radiated by laser oscillator 2 toward a position brittle material 1 is placed. Mirror 4 has, for example, a reflectance of 90% or more for the wavelength of laser beam 3.

Condenser lens 5 is a lens to converge laser beam 3 reflected by mirror 4. Condenser lens 5 having, for example, a numerical aperture (NA) of 0.95 is selected. In addition, condenser lens 5 is applicable as long as its numerical aperture (NA) is 0.1 or more and 0.95 or less for the wavelength of laser beam 3.

Condenser lens 5 desirably has an aberration correction function. This allows the laser beam to be easily converged in both cases where laser beam 3 is radiated from a front surface side and laser beam 3 is radiated from a back surface side to a position at a predetermined thickness inside brittle material 1. In other words, in both cases where laser beam 3 is radiated from the front surface side and laser beam 3 is radiated from the back surface side, this can prevent the focus point from extending toward an incident direction of laser beam 3 due to spherical aberration of the lens, so energy density of laser beam 3 at the focus point can be made higher.

As a method for correcting aberration, however, a method using phase modulation element 11 can be used in addition to the method using condenser lens 5.

Z stage 6 is displacing means that moves fixing jig 9 with brittle material 1 placed thereon in a Z direction (which hereinafter represents a thickness direction of brittle material 1). Z stage 6 to be used has, for example, a movement accuracy of at least 1 μm or less per pitch and an amount of available stroke of 10 mm or more.

XY stage 7 is displacing means that moves fixing jig 9 with brittle material 1 placed thereon in an XY direction (which hereinafter represents two orthogonal directions in parallel with a substrate surface of brittle material 1). XY stage 7 is disposed, for example, on the Z stage. XY stage 7 to be used has, for example, a movement accuracy of at least 1 μm or less per pitch and an amount of available stroke of 200 mm or more in both X and Y directions. Furthermore, XY stage 7 to be used is variable, for example, in scanning speed within a range from 0.1 mm/s or more to 3 mm/s or less.

Fixing jig 9 is a jig to fix brittle material 1. Fixing jig 9 fixes brittle material 1 in a state of being able to move the position of brittle material 1 by using Z stage 6 and XY stage 7. Fixing jig 9 according to the embodiment is, for example, connected with XY stage 7 via fixing jig 12, and configured to be able to move the position of brittle material 1 in the XY direction with XY stage 7. In addition, fixing jig 9 according to the embodiment is, for example, connected with Z stage 6 via fixing jig 12 and XY stage 7, and configured to be able to move the position of brittle material 1 in the Z direction with Z stage 6.

Fixing jig 9 is configured to allow laser beam 3 to be radiated to the front surface and back surface of brittle material 1. Fixing jig 9 is suitable, for example, if its undersurface portion with brittle material 1 disposed thereon is composed of a transparent material for laser beam 3 or it has a configuration to pinch and fix sides of brittle material 1 so as to expose the front and back surfaces of brittle material 1. The transparent material for laser beam 3 is suitable if it is, for example, a material, such as glass or the like, that allows laser beam 3 to enter and has a transmittance of 90% or more.

Phase modulation element 11 makes laser beam 3 branch off to a plurality of beams. Phase modulation element 11 is not limited to a special product and, for example, a diffraction grating (DOE) or the like is used.

Fixing jig 12 is a jig to couple fixing jig 9 that fixes brittle material 1 with XY stage 7.

Laser beam path switching apparatus 13 is an apparatus to change a beam path of laser beam 3 radiated by laser oscillator 2. Laser beam path switching apparatus 13 is preferably configured to be able to radiate laser beam 3 to a suitable position on the back surface side of brittle material 1 under control from control computer 10.

As laser beam path switching apparatus 13, for example, a half shutter and mirror, an electro-optic modulator, an acousto-optic element, or the like is used. However, the frequency of laser beam 3 is high, so laser beam path switching apparatus 13 is preferably an apparatus using an electro-optic modulator or acousto-optic element capable of high-speed switching. Laser beam path switching apparatus 13 instantaneously changes the beam path of laser beam 3 using, for example, an apparatus using the acousto-optic element.

Camera 14 captures an image of a surface state of brittle material 1. Camera 14, for example, confirms the surface state of brittle material 1 before forming a modified layer inside brittle material 1 by laser beam 3, detects defective part P on the surface of brittle material 1, and communicates information on a position of defective part P in brittle material 1 to control computer 10.

Camera 14 may be a general visible light camera, or may be an infrared camera or an imaging apparatus using an ultrasonic sound or the like. In addition, camera 14 may take an image of an inside state of brittle material 1 instead of the surface state of brittle material 1.

Control computer 10 is a control apparatus to integrally control sections of laser slicing apparatus U. Control computer 10, for example, communicates data with laser oscillator 2, laser beam path switching apparatus 13, Z stage 6, XY stage 7, and camera 14, and integrally controls a process to separate a semiconductor wafer from brittle material 1 (described later in detail).

Control computer 10 includes control section 10a and light shielding area detection section 10b.

Control section 10a radiates laser beam 3 (hereinafter also referred to as "first laser beam") from a first front surface side so as to scan across a whole area of a surface (hereinafter also referred to as "first surface") of one side of brittle material 1, and forms a modified layer (hereinafter also referred to as "first modified layer") in a to-be-sliced plane inside brittle material 1.

In addition, control section 10a radiates laser beam 3 (hereinafter also referred to as "second laser beam") to a light shielding area (described later) of brittle material 1 from a back surface (hereinafter also referred to as "second surface") of brittle material 1, and forms a modified layer (hereinafter also referred to as "second modified layer") in such a manner that the second modified layer is continuous with the first modified layer in the to-be-sliced plane. Furthermore, control section 10a detects the light shielding area on the basis of detection results from light shielding area detection section 10b.

Control section 10a controls laser oscillator 2, laser beam path switching apparatus 13, Z stage 6, XY stage 7, and the like, and achieves the functions.

"To-be-sliced plane" is a boundary plane to eventually divide brittle material 1 and a whole area at a predetermined height position in the thickness direction (±Z direction) inside brittle material 1 (In each figure, reference numeral 1a indicates the to-be-sliced plane). Control section 10a typically forms the first modified layer on the whole area of the to-be-sliced plane without a gap. However, control section 10a may be configured not to form the first modified layer regarding part (for example, an area where there is defective part P of the to-be-sliced plane) of the whole area of the to-be-sliced plane.

Light shielding area detection section 10b detects a light shielding area (which hereinafter represents an area to prevent laser beam 3 from reaching the to-be-sliced plane when laser beam 3 is radiated from the front surface side of brittle material 1) existing on the front surface side of brittle material 1 on the basis of a surface state of the front surface of brittle material 1 obtained from camera 14.

The light shielding area of brittle material 1 is typically the position of defective part P existing on the front surface side of brittle material 1. Color has changed at a part where first modified layer 17 is, but an unmodified area (that is, a light shielding area) has an original color of brittle material 1, so the place can be easily identified with camera 14. Light shielding area detection section 10b does not necessarily need to identify whether the light shielding area is caused by defective part P of brittle material 1 or other accretions.

Detection timing of defective part P by light shielding area detection section 10b may be timing before executing the process of control section 10a or may be timing corresponding to each scanning position of laser beam 3 while executing the process of control section 10a. Alternatively, it may be timing after radiating laser beam 3 across the whole area of the front surface side of brittle material 1.

Above-described control computer 10 is, for example, a microcomputer including a CPU (Central Processing Unit), a ROM (Read Only Memory), a RAM (Random Access Memory), an input port, an output port, and the like. Functions of control section 10a and light shielding area detection section 10b held by control computer 10 are achieved by, for example, referring to, by the CPU, control programs and various types of data stored in the ROM and RAM. However, the functions can be obviously achieved by not only processes by software but also a dedicated hardware circuit or combination of those. Obviously, control computer 10 may be composed of a plurality of computers.

[Operation of Laser Slicing Apparatus]

Figure 2:
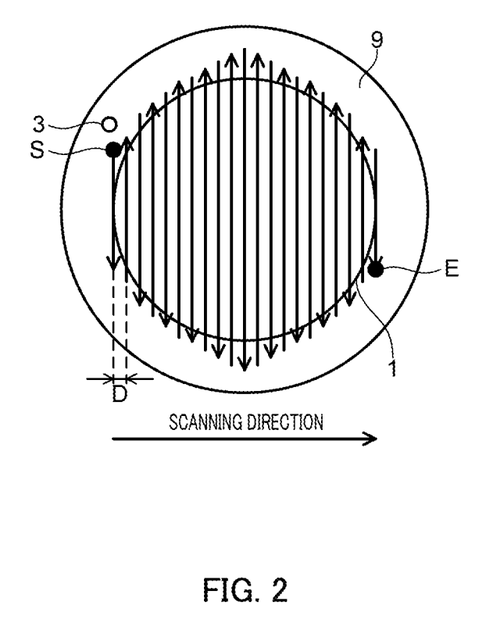
FIG. 2 is a schematic diagram showing a scanning method for laser radiation of the laser slicing apparatus according to the first embodiment.

FIG. 2 is a schematic diagram showing a scanning method for laser radiation of laser slicing apparatus U according to the embodiment.

FIG. 2 illustrates a scanning method for laser radiation to linearly scan laser beam 3 as a typical example. Laser slicing apparatus U according to the present embodiment moves XY stage 7 with brittle material 1 placed thereon, thereby moves a relative position of brittle material 1 with respect to laser beam 3, and radiates laser beam 3 to the whole area of the front surface side of brittle material 1.

Laser slicing apparatus U according to the embodiment linearly moves XY stage 7 in the Y direction from starting point S to make it reach from one end side to the other end side of the front surface of brittle material 1. Next, laser slicing apparatus U according to the embodiment moves XY stage 7 in the X direction by width D (that is, pitch width), and then linearly moves it from the other end side to the one end side of the front surface of brittle material 1 in the same manner. Laser slicing apparatus U according to the embodiment repeats the scanning, sequentially scans the whole area of the front surface of brittle material 1, and scans as far as end point E in FIG. 2. End point E is a radiation end position of laser beam 3. Pitch width D is set to a pitch corresponding to a beam diameter of laser beam 3 on the front surface of brittle material 1.

In this way, modified layer 17 is formed across the whole area of the to-be-sliced plane inside brittle material 1. Here, "modified layer" is a layer formed by decomposing a compound of brittle material 1 when laser beam 3 converged by condenser lens 5 is radiated to the inside of brittle material 1. In modified layer 17, if the material of brittle material 1 is GaN, it is decomposed as follows: $2GaN \rightarrow 2Ga+N_2$.

In the laser scanning, however, because there is a need to remove gas (for example, $N_2$ gas if the material is GaN) generated when brittle material 1 is modified, it is desirable to continuously form modified layer 17 from the one end side to the other end side of brittle material 1.

An amount of formation of modified layer 17 (typically, width of modified layer 17 in a height direction) can be changed by scanning speed, a frequency of laser beam 3 (or an interval between pulses of laser beam 3), pitch width D, or the like during laser scanning.

Depth of the to-be-sliced plane inside brittle material 1 is set to a value that allows substrate 1S to secure a desired wafer thickness even if the slice surface is ground and polished after slicing.

FIGS. 3A, 3B, 3C, and 3D are diagrams showing an outline of a processing flow for brittle material 1 by general laser slicing apparatus U.

Figure 3A:
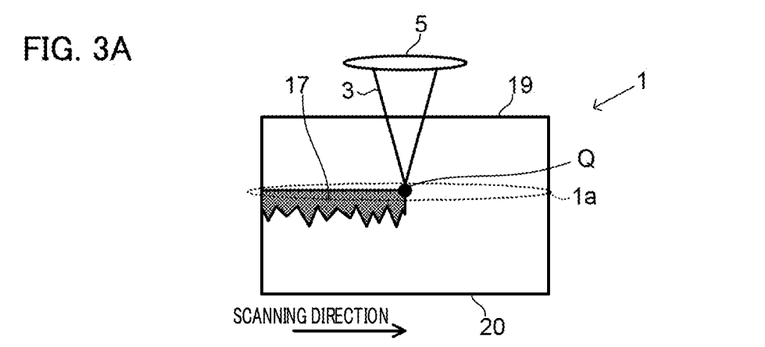
FIG. 3A is a diagram showing an outline of a processing flow for a brittle material by a general laser slicing apparatus.
Figure 3B:
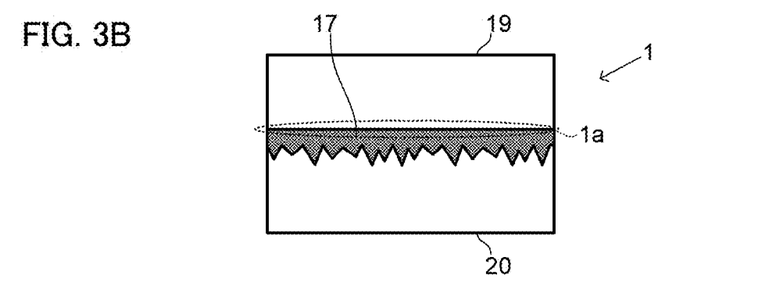
FIG. 3B is a diagram showing the outline of the processing flow for the brittle material by the general laser slicing apparatus.
Figure 3C:
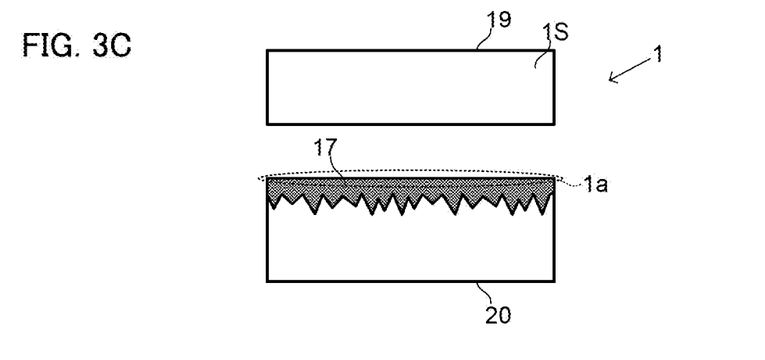
FIG. 3C is a diagram showing the outline of the processing flow for the brittle material by the general laser slicing apparatus.
Figure 3D:
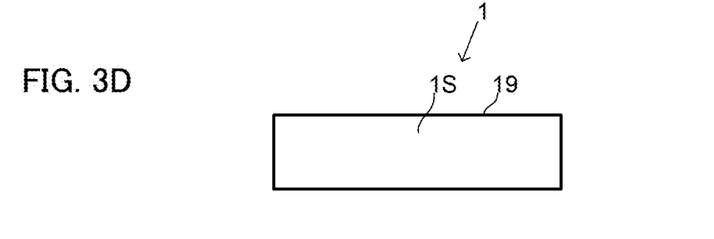
FIG. 3D is a diagram showing the outline of the processing flow for the brittle material by the general laser slicing apparatus.

FIG. 3A shows a midway state of forming modified layer 17 inside brittle material 1. FIG. 3B shows a state of having finished forming modified layer 17 in the to-be-sliced plane inside brittle material 1. FIG. 3C shows a state of having separated substrate material (semiconductor wafer) 1S from brittle material 1 at the to-be-sliced plane inside brittle material 1 as a boundary surface. FIG. 3D shows a semiconductor wafer produced from brittle material 1.

In FIGS. 3A, 3B, 3C, and 3D, reference numerals 19, 20, and 17 denote respectively the front surface of brittle material 1, the back surface of brittle material 1, and the modified layer formed inside brittle material 1, and reference sign Q denotes the focus point of laser beam 3. Focus point (processing point) Q is a point where laser beam 3 is converged inside brittle material 1 by condenser lens 5, and a point where processing is actually carried out.

Laser slicing apparatus U according to the embodiment adjusts a relative positional relation between brittle material 1 and condenser lens 5 in the height direction so that focus point Q can be made at a specified depth from a surface of brittle material 1 by using Z stage 6. Then, laser slicing apparatus U radiates laser beam 3 from laser oscillator 2, reflects it with mirror 4, has it pass through condenser lens 5, vertically radiates laser beam 3 to the substrate surface of brittle material 1, and forms focus point Q inside brittle material 1. This makes brittle material 1 modified at focus point Q inside brittle material 1 by multiphoton absorption (FIG. 3A).

Laser slicing apparatus U scans laser beam 3 in the above-described manner by using XY stage 7, and thereby forms modified layer 17 on the whole area of the to-be-sliced plane inside brittle material 1 (FIG. 3B). Laser slicing apparatus U then divides brittle material 1 into an upper layer side and a lower layer side starting from an upper plane (to-be-sliced plane) of modified layer 17 (FIGS. 3C and 3D). At this time, if modified layer 17 is formed on the whole area of the to-be-sliced plane inside brittle material 1, brittle material 1 is divided into the upper layer side and lower layer side like detaching without applying almost any force starting from the to-be-sliced plane of brittle material 1.

Substrate 1S after division is made into a finished product (for example, a semiconductor wafer) via, for example, a polishing step, a post-step.

When modified layer 17 is to be formed only from the side of front surface 19 as seen in FIG. 3A, a defective part (for example, a pit or flaw) existing inside brittle material 1 prevents laser beam 3 from entering the inside of brittle material 1, leaving an area below the defective part as an unmodified area. As a result, a chip or crack occurs in separated substrate 1S (semiconductor wafer) due to the unmodified area in a detaching step in FIG. 3C.

Figure 4A:
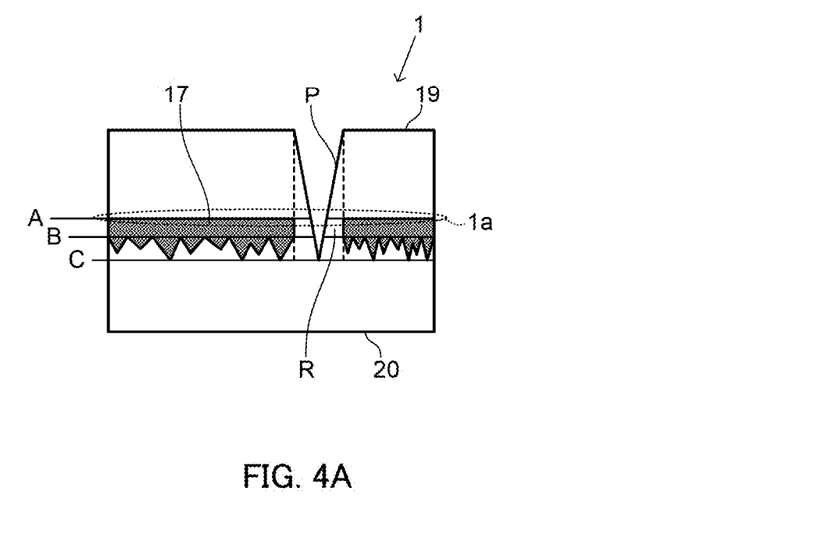
FIG. 4A is a diagram illustrating a laser slicing method according to the first embodiment.
Figure 4B:
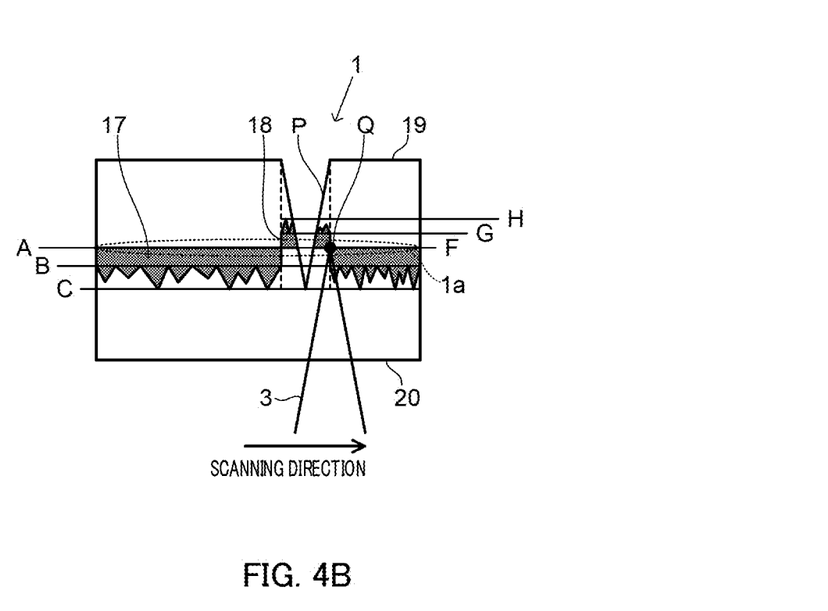
FIG. 4B is a diagram illustrating the laser slicing method according to the first embodiment.

FIGS. 4A and 4B are diagrams illustrating a laser slicing method according to the embodiment. FIGS. 4A and 4B are side sectional views of brittle material 1 seen from a direction vertical to a laser radiation direction.

The laser slicing method according to the embodiment includes two steps: a first radiation step of radiating laser beam 3 from the side of front surface 19 of brittle material 1; and a second radiation step of radiating laser beam 3 from the side of back surface 20 of brittle material 1. FIG. 4A shows the first radiation step in the laser slicing method according to the embodiment and FIG. 4B the second radiation step in the laser slicing method according to the embodiment.

In FIGS. 4A and 4B, defective part P is a defect existing inside brittle material 1. For example, in the case of GaN, it is called a pit, its shape varies, but a representative shape is a hexagonal pyramid-shaped hole, and it often looks like black. A size of defective part P varies from several μm to several mm. At defective part P, converging is not carried out well due to difference in shape and refractive index from other areas, and an unmodified area is formed.

Here, brittle material 1 is disposed such that, for example, in the case of GaN, an N surface side is the side of front surface 19, in other words, a Ga surface side is the side of back surface 20. In the laser slicing method described below, description will be given in a state of being disposed such that the N surface side is the side of front surface 19. It is alright, however, to dispose it such that the Ga surface side is the side of front surface 19, in other words, the N surface side is the side of back surface 20. Such a case includes a case where a pit is formed on the Ga surface side.

The laser slicing method according to the embodiment forms first modified layer 17 across the whole area of the to-be-sliced plane inside brittle material 1 as seen in FIG. 2 from surface 19 of the one side of brittle material 1 in the first radiation step (FIG. 4A). Then, second modified layer 18 is formed only at an area where defective part P is from surface 20 of the other side of brittle material 1 so as to be continuous with first modified layer 17 in the to-be-sliced plane in the second radiation step (FIG. 4B).

The laser slicing method according to the embodiment forms first modified layer 17, for example, for each scanning position, and regarding the position of defective part P, makes laser beam 3 enter from the second surface 20 side by laser beam path switching apparatus 13, and forms second modified layer 18.

However, the first radiation step (FIG. 4A) and second radiation step (FIG. 4B) may be carried out for each scanning position, or the second radiation step (FIG. 4B) may be carried out after scanning across the whole area on the front surface side in the first radiation step (FIG. 4A). Conversely, the whole area on the front surface side may be scanned in the first radiation step (FIG. 4A) after modifying only an area where defective part P is in the second radiation step (FIG. 4B).

In FIG. 4A, first modified layer upper plane A is an upper plane of first modified layer 17, and represents a detachment plane serving as a starting point when brittle material 1 is detached, that is, the to-be-sliced plane. First modified layer upper plane A is formed by scanning of focus point Q of laser beam 3.

First modified layer middle plane B is an undersurface of an area where a modified area is formed under first modified layer upper plane A of first modified layer 17 and a modified part definitely exists. Width A-B in the thickness direction (that is, distance from first modified layer upper plane A to first modified layer meddle plane B) can be changed according to modifying conditions, and can be in a range from 1 μm to 300 μm, but is preferably made smaller as much as possible because material loss becomes larger as the width is larger.

First modified layer lower plane C is a plane corresponding to the deepest position of first modified layer 17 formed by converged radiation to the inside, and width A-C in the thickness direction (that is, distance from first modified layer upper plane A to first modified layer lower plane C) serves as an index of surface roughness. Because, if the width is large, material loss becomes larger and it takes times in a polishing step, it is desirable that the width is made smaller as much as possible.

Unmodified area R is an area where a modified layer is not formed because laser beam 3 was blocked by defective part P and a part below defective part P was not processed when laser beam 3 was converged and radiated by condenser lens 5. If unmodified area R is large, a chip occurs in GaN substrate 1S starting from unmodified area R when the GaN is divided starting from the modified layer.

In FIG. 4B, second modified layer 18 represents a modified area formed when laser beam 3 is converged and radiated to the inside of brittle material 1 by condenser lens 5 from the direction of second surface 20, the back surface of first surface 19. At the position where defective part P is, the beam path is changed by laser beam path switching apparatus 13 and second modified layer 18 is formed.

Second modified layer upper plane F is an upper plane of second modified layer 18, and second modified layer upper plane F corresponds to the height position of focus point Q of laser beam 3. In other words, second modified layer upper plane F is a detachment plane serving as a starting point when brittle material 1 is detached.

Second modified layer middle plane G is an undersurface of an area where a modified area is formed under second modified layer upper plane F of second modified layer 18 and a modified part definitely exists. Width F-G in the thickness direction (that is, width between second modified layer upper plane F and second modified layer middle plane G) can be changed according to the modifying conditions, and can be in a range from 1 μm to 300 μm.

Second modified layer lower plane H is a plane corresponding to the deepest position of second modified layer 18 where a modified layer is formed by converged radiation to the inside, and width F-H in the thickness direction serves as an index of surface roughness.

Laser slicing apparatus U according to the embodiment maintains control so that the focus point of laser beam 3 inside brittle material 1 is at the height position of the to-be-sliced plane in any of forming first modified layer 17 and forming second modified layer 18. Typically, it is preferable that second modified layer upper plane F formed by focus point Q converged with condenser lens 5 of laser beam 3 that entered from the second surface 20 side is substantially the same plane as first modified layer upper plane A.

In this way, the first radiation step (FIG. 4A) and second radiation step (FIG. 4B) are carried out, first modified layer 17 and second modified layer 18 are formed across the whole area of the to-be-sliced plane inside brittle material 1, and thereby brittle material 1 is to be divided starting from the to-be-sliced plane.

Of brittle material 1 divided in this way, a divided part on the side of front surface 19 is typically used as semiconductor wafer 1S. However, by planarizing brittle material 1 in advance into the thickness of about two wafers, a divided part on the side of back surface 20 can be also used as semiconductor wafer 1S in addition to that of the side of front surface 19.

It is preferable that there is no unmodified area R when brittle material 1 is detached starting from first modified layer 17 upper plane A. Therefore, second modified layer 18 needs to be continuous with first modified layer 17. That is, it is preferable that second modified layer upper plane F formed by focus point Q converged with condenser lens 5 of laser beam 3 that entered from the second surface 20 side is substantially the same plane as first modified layer upper plane A.

As methods for aligning height positions of focus point Q in first modified layer 17 and second modified layer 18, for example, a method of previously measuring the thickness of brittle material 1 and changing the focus position according to the refractive index of brittle material 1 may be used, or a method of detecting a modified position from a color change when the modified layer was formed inside brittle material 1 and adjusting a focal position may be used, although the methods are not limited to those.

If it is difficult to align focus point Q, processing may be executed such that second modified layer upper plane F is formed within a range between upper plane A and middle plane B of first modified layer 17. This configuration allows brittle material 1 to be detached in a state of no unmodified area R, so chips can be prevented.

Second modified layer 18 formed below defective part P is formed on the first surface 19 side than at least middle plane B of first modified layer 17, but it is not a problem at all because a part where defective part P is cannot be used as a device.

However, it is desirable that a surface targeted in the first radiation step (FIG. 4A) among front surface 19 and back surface 20 of brittle material 1 is a surface of a side where more defective parts P expose.

For example, in the case of using GaN as brittle material 1, it is desirable to use the surface of the N surface side as a target of the first radiation step (FIG. 4A). What is generally called a functional face is a Ga polar face side of GaN crystal, and the GaN is used as an LED or a device by performing epitaxial growth on a Ga surface of a produced GaN substrate. Therefore, it is desirable to minimize, on the Ga surface side, the modified area and an area influenced by heat in the vicinity of the modified area. In addition, when laser beam 3 is radiated, the modified area extends starting from focus point Q toward a laser incident direction, therefore an incident side of laser beam 3 is easily influenced by modification and heat, and the modified plane is roughened. That is, by using the surface of the N surface side regarding the inside of the GaN as the target of the first radiation step (FIG. 4A), impact of modification and heat on the Ga surface, the functional face, can be reduced, and the polishing step can be shortened. This allows substrate costs and material loss to be reduced.

In the first radiation step, it is desirable not to radiate laser beam 3 to defective part P if a diameter of defective part P on first surface 19 of brittle material 1 is larger than the beam diameter of laser beam 3. This allows for processing of the whole area in the first radiation step without changing conditions of laser beam 3.

[Effects]

As described above, laser slicing apparatus U according to the embodiment includes: light shielding area detection section 10b that detects light shielding areas existing on the first surface side of brittle material 1; and control section 10a that radiates first laser beam 3 from the first surface side so as to scan across the whole area of the first surface of brittle material 1 and forms first modified layer 17 in the to-be-sliced plane inside brittle material 1, and that radiates the second laser beam to the light shielding areas of brittle material 1 from the second surface and forms second modified layer 18 in such a manner that second modified layer 18 is continuous with first modified layer 17 in the to-be-sliced plane.

Thus, laser slicing apparatus U can modify across the whole area of the to-be-sliced plane inside brittle material 1 even in the case where defective part P is inside brittle material 1. This can prevent chips or cracks from occurring in substrate 15 due to an unmodified area inside brittle material 1 when substrate 15 (for example, a semiconductor wafer) is detached from brittle material 1 after forming the modified layers (first modified layer 17 and second modified layer 18). In other words, this allows a defect rate of substrate 15 due to slits or cracks to be reduced, that is, a yield can be improved.

Second Embodiment

Next, laser slicing apparatus U according to a second embodiment will be described with reference to FIGS. 5, 6A, 6B, 6C, 7A, and 7B. Laser slicing apparatus U according to the embodiment is different from laser slicing apparatus U according to the first embodiment in terms of a scanning method of laser radiation and a radiation method of laser beam 3 to the side of back surface 20 of brittle material 1. In addition, regarding configurations common to the first embodiment, description will be omitted.

Figure 5:
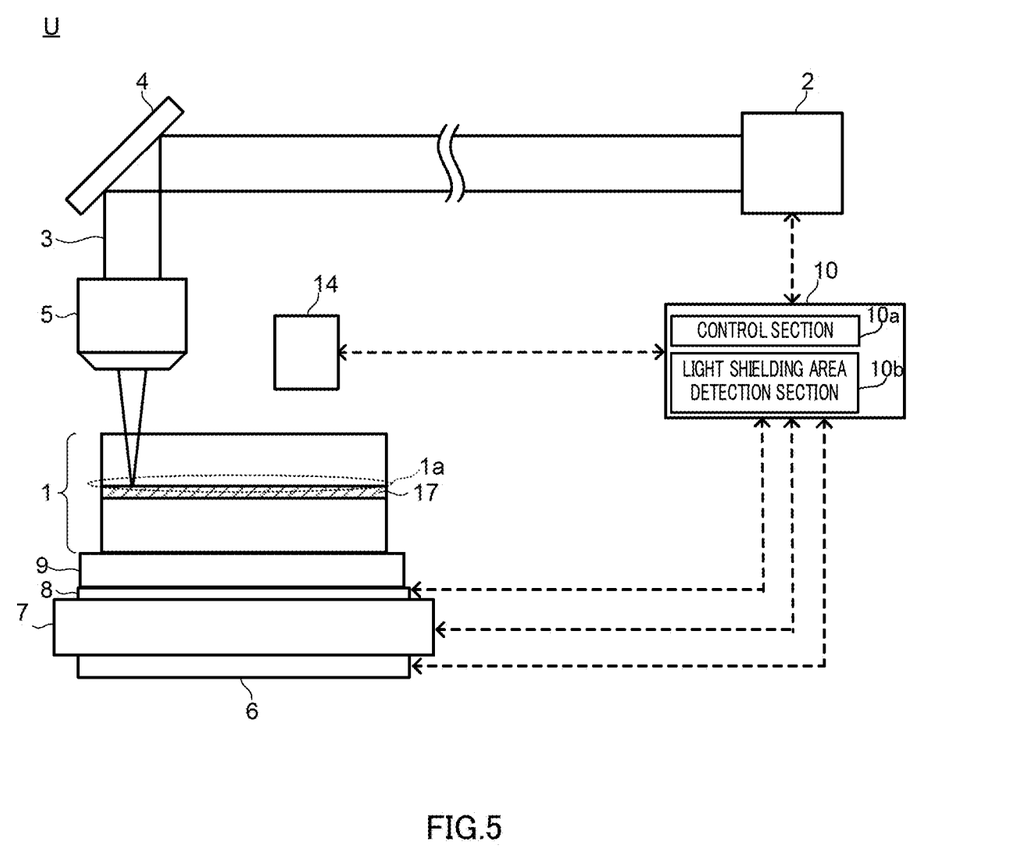
FIG. 5 is an apparatus schematic diagram of a laser slicing apparatus according to a second embodiment.

FIG. 5 is an apparatus schematic diagram of laser slicing apparatus U according to the embodiment.

Laser slicing apparatus U according to the embodiment includes a rotary stage 8. Rotary stage 8 is disposed on XY stage 7. In addition, rotary stage 8 is variable in rotational speed, for example, in a range from 0.1 rpm or more to 2,000 rpm or less. Laser slicing apparatus U according to the embodiment converges and radiates the laser beam to the inside of brittle material 1 while control computer 10 is controlling Z stage 6, XY stage 7, or rotary stage 8, and scanning.

On the other hand, because laser slicing apparatus U according to the embodiment is configured to turn over brittle material 1 on XY stage 7 when laser beam 3 is to be radiated from back surface 20 of brittle material 1, it does not include laser beam path switching apparatus 13.

Figure 6A:
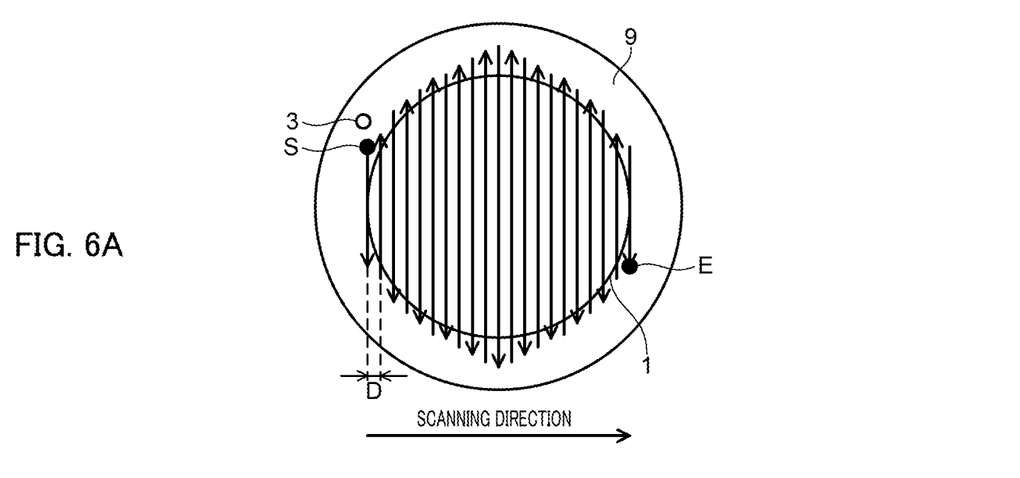
FIG. 6A is a schematic diagram showing a scanning method of the laser slicing apparatus according to the second embodiment.
Figure 6B:
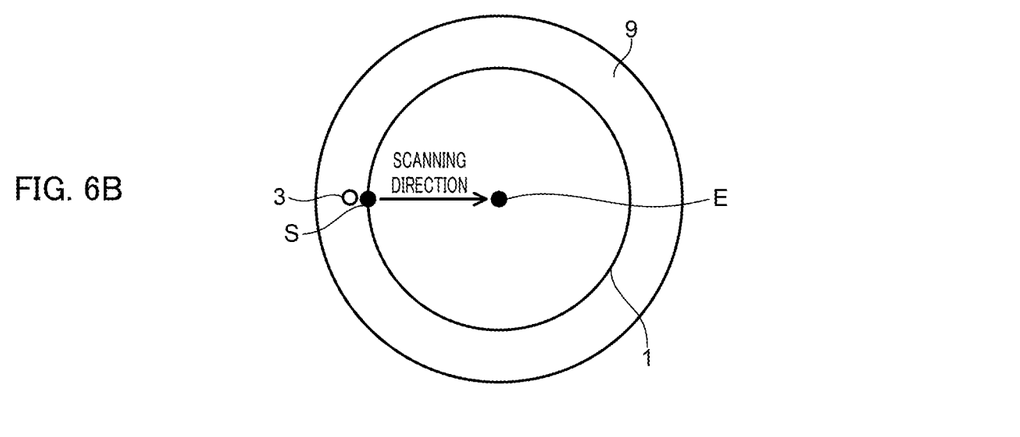
FIG. 6B is a schematic diagram showing a scanning method of the laser slicing apparatus according to the second embodiment.
Figure 6C:
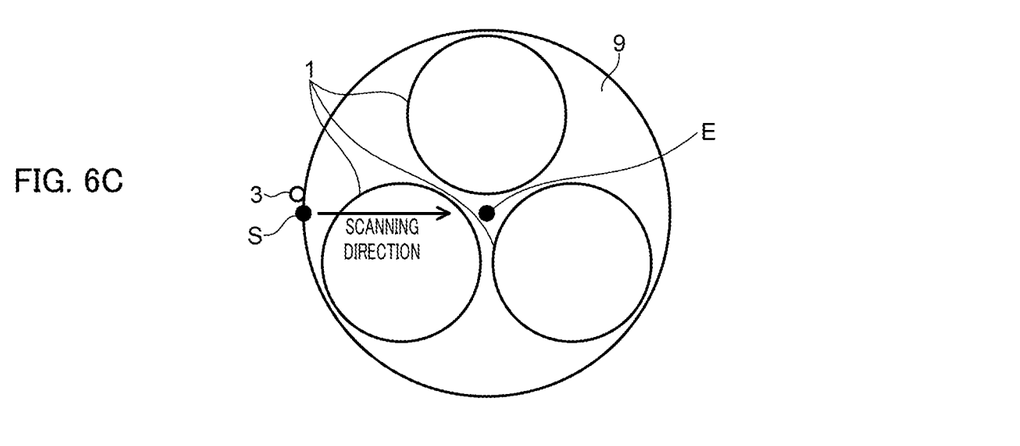
FIG. 6C is a schematic diagram showing a scanning method of the laser slicing apparatus according to the second embodiment.

FIGS. 6A, 6B, and 6C are schematic diagrams showing a scanning method of laser slicing apparatus U according to the embodiment.

FIGS. 6A, 6B, and 6C show respective three types of scanning methods using laser slicing apparatus U according to the embodiment.

FIG. 6A is a scanning method of laser radiation for linearly scanning laser beam 3 in the same manner as the scanning method of laser slicing apparatus U according to the first embodiment shown in FIG. 2. In this case, because rotary stage 8 is not moved, the scanning method is the same as the scanning method of laser slicing apparatus U according to the first embodiment.

FIG. 6B is a scanning method of laser radiation when one piece of brittle material 1 is processed circumferentially. In this case, XY stage 7 is moved such that laser beam 3 scans from starting point S in an outer area in a radial direction of rotary stage 8 to end point E at a rotation center while rotary stage 8 is being rotated. At this time, control computer 10 controls scanning speed of laser beam 3 on XY stage 7 in consideration of a rotation number of rotary stage 8 at focus point Q, and thereby maintains control so that pulse 14 of laser beam 3 is radiated at even intervals.

FIG. 6C is a scanning method of laser radiation when multiple pieces of brittle material 1 are processed circumferentially. For the scanning method in FIG. 6B, angular velocity decelerates as laser beam 3 comes closer to a center part when it scans toward a center direction, there is a risk that laser beam 3 is excessively radiated in the vicinity of end point E. In FIG. 6C, the multiple pieces of brittle material 1 are disposed, which allows radiation in the vicinity of the center part to be avoided, so excess radiation of laser beam 3 can be prevented.

The scanning method in FIG. 6C rotates rotary stage 8 and radiates laser beam 3 from starting point S to end point E, that is, from an outer edge of brittle material 1 toward the center direction of rotary stage 8 in the same manner as that in FIG. 6B. At this time, control computer 10 controls the scanning speed of laser beam 3 on XY stage 7 in consideration of the rotation number of rotary stage 8 at focus point Q, and thereby maintains control so that the pulse of laser beam 3 is radiated at even intervals.

Figure 7A:
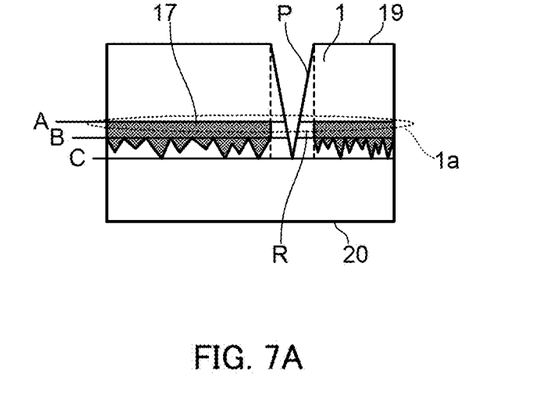
FIG. 7A is a diagram illustrating a laser slicing method according to the second embodiment.
Figure 7B:
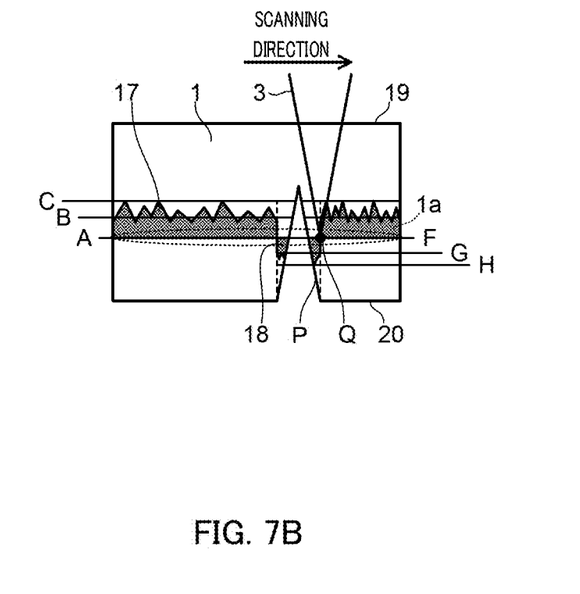
FIG. 7B is a diagram illustrating the laser slicing method according to the second embodiment.

FIGS. 7A and 7B are diagrams illustrating a laser slicing method according to the embodiment. FIGS. 7A and 7B are side sectional views of brittle material 1 seen from the direction vertical to the laser radiation direction.

The laser slicing method according to the embodiment includes two steps of a first radiation step and second radiation step in the same manner as the laser slicing method according to the first embodiment. FIG. 7A shows the first radiation step of the laser slicing method according to the embodiment, and FIG. 7B the second radiation step of the laser slicing method according to the embodiment.

The first radiation step according to the embodiment (FIG. 7A) adjusts a relative positional relation in the height direction between brittle material 1 and condenser lens 5 so that focus point Q can be formed at a specified depth from the surface of brittle material 1 by using Z stage 6. Then, it uses XY stage 7 to move to starting point S for radiating laser beam 3 to the outer edge of brittle material 1, oscillates it from laser oscillator 2, reflects it with mirror 4, has it pass through condenser lens 5, vertically radiates it to brittle material 1, forms focus point Q inside brittle material 1, modifies brittle material 1 by multiphoton absorption, and forms first modified layer 17. Then, it processes as far as end point E.

The second radiation step according to the embodiment (FIG. 7B), after the first radiation step (FIG. 7A), takes out brittle material 1, turns it over so that laser beam 3 can enter from second surface 20, the back surface of first surface 19, converges and radiates laser beam 3 to the position of defective part P from second surface 20 with condenser lens 5.

In this case, other methods and aspects may be used, for example, an aspect to obtain the position of defective part P with camera 14, then turn over brittle material 1, and then process, or a method to form first modified layer 17, then detect unmodified area R with camera 14, and then process.

The latter method can also detect a position where brittle material 1 was not processed due to a stain, foreign matter, or the like on first surface 19. In the former method, it is desirable not to radiate laser beam 3 to defective part P from first surface 19. This is for minimizing heat impact.

As described above, laser slicing apparatus U according to the embodiment can also prevent chips or cracks from occurring in substrate 15 due to an unmodified area inside brittle material 1 when substrate 15 (for example, a semiconductor wafer) is detached from brittle material 1 after formation of the modified layers (first modified layer 17 and second modified layer 18), in the same manner as laser slicing apparatus U according to the first embodiment.

Hereinbefore, specific examples of the present invention are described in detail, those are merely an exemplification in every respect and should not be considered as limitative to appended claims. Techniques described in the scope of the appended claims include various alterations and modifications of the above-exemplified examples.

CROSS REFERENCE TO RELATED APPLICATIONS

This application is based upon Japanese Patent Application No. 2018-007511 filed on Jan. 19, 2018, and Japanese Patent Application No. 2018-212024 filed on Nov. 12, 2018; the entire contents of which are incorporated herein by reference.

INDUSTRIAL APPLICABILITY

The laser slicing apparatus according to the present invention allows a workpiece to be divided without causing chips or cracks to occur even if there are defective parts within a brittle material.

REFERENCE SIGNS LIST

1 Brittle material
2 Laser oscillator
3 Laser beam
4 Mirror
5 Condenser lens
6 Z stage
7 XY stage
8 Rotary stage
9 Fixing jig
10 Control computer
11 Phase modulation element
12 Fixing jig
13 Laser beam path switching apparatus
14 Camera 17 First modified layer
18 Second modified layer
19 First surface (Front surface)
20 Second surface (Back surface)
A First modified layer upper plane
B First modified layer middle plane
C First modified layer lower plane
D Width
F Second modified layer upper plane
G Second modified layer middle plane
H Second modified layer lower plane
S Starting point
E End point
R Unmodified area
P Defective part
Q Focus point

The invention claimed is:

1. A laser slicing apparatus configured to divide a workpiece horizontally into an upper layer side and a lower layer side with a laser beam including a first laser beam and a second laser beam, the laser slicing apparatus comprising:
a hardware processor configured to: detect a defective part existing on a side of a first surface of the workpiece;
radiate the first laser beam from the side of the first surface so as to scan across a whole area of the first surface of the workpiece, the first laser beam having a first point of convergence, and form a first modified layer coinciding with the first point of convergence in a to-be-sliced plane inside the workpiece; and
radiate the second laser beam to, in plan view, only an area where the defective part exists in the workpiece from a second surface on an opposite side of the first surface, the second laser beam having a second point of convergence, and form a second modified layer coinciding with the second point of convergence in such a manner that the second modified layer is continuous with the first modified layer in the to-be-sliced plane,
wherein the laser slicing apparatus is configured to slice the workpiece horizontally into the upper layer side and the lower layer side along the to-be-sliced plane in a detaching step, after the first modified layer and the second modified layer are formed.

2. The laser slicing apparatus according to claim 1, wherein a substrate material is separated from the workpiece.

3. The laser slicing apparatus according to claim 2, wherein the workpiece is a plate-like body.

4. The laser slicing apparatus according to claim 3, wherein the workpiece is a plate-like member which has undergone a planarizing process until the first surface and the second surface have a predetermined surface roughness or less.

5. The laser slicing apparatus according to claim 1, wherein the workpiece is a plate-like semiconductor material having a first plate surface and a second plate surface, and the first surface is a surface of a side where more of the defective part are exposed among the first plate surface and the second plate surface of the workpiece.

6. The laser slicing apparatus according to claim 1, wherein the workpiece is a semiconductor material, and wherein the side of the first surface is located on the upper layer side, and wherein the upper layer side is used as a semiconductor wafer.

7. The laser slicing apparatus according to claim 1, wherein the workpiece is gallium nitride, and wherein the side of the first surface is located on the upper layer side, and wherein the upper layer side is used as a semiconductor wafer.

8. The laser slicing apparatus according to claim 1, wherein the workpiece is a brittle material.

9. The laser slicing apparatus according to claim 1, wherein the hardware processor sets a focus point of the first laser beam to a height position of the to-be-sliced plane to form the first modified layer and sets a focus point of the second laser beam to the height position of the to-be-sliced plane to form the second modified layer.

10. The laser slicing apparatus according to claim 9, wherein the hardware processor causes a laser beam path of a laser beam radiated by a laser oscillator to switch to radiate the first laser beam and the second laser beam to the workpiece.

11. The laser slicing apparatus according to claim 1, wherein the hardware processor detects the defective part on a basis of information from a camera that captures an image of a surface state of the first surface of the workpiece.

12. A laser slicing method for slicing a workpiece horizontally into an upper layer side and a lower layer side with a laser beam including a first laser beam and a second laser beam, the method comprising:
detecting a defective part existing on a side of a first surface of the workpiece;
radiating the first laser beam from the side of the first surface so as to scan across a whole area of the first surface of the workpiece, the first laser beam having a first point of convergence, and forming a first modified layer coinciding with the first point of convergence in a to-be-sliced plane inside the workpiece; and
radiating the second laser beam to, in plan view, only an area where the defective part exists in the workpiece from a second surface on an opposite side of the first surface, the second laser beam having a second point of convergence, and forming a second modified layer coinciding with the second point of convergence in such a manner that the second modified layer is continuous with the first modified layer in the to-be-sliced plane,
slicing the workpiece horizontally into the upper layer side and the lower layer side along the to-be-sliced plane in a detaching step, after the first modified layer and the second modified layer are formed.

13. The laser slicing apparatus according to claim 1, wherein a width of a radiation region of the second laser is a width corresponding to a width of the defective part on the first surface of the workpiece in cross-sectional view of the workpiece.

* * * * *